United States Patent
Chen et al.

(10) Patent No.: US 9,384,770 B2
(45) Date of Patent: Jul. 5, 2016

(54) NEAR-FIELD TRANSDUCER WITH ENLARGED REGION, PEG REGION, AND HEAT SINK REGION

(71) Applicant: Seagate Technology LLC, Cupertino, CA (US)

(72) Inventors: Weibin Chen, Bloomington, MN (US); Chubing Peng, Eden Prairie, MN (US); Werner Scholz, Edina, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 100 days.

(21) Appl. No.: 13/961,638

(22) Filed: Aug. 7, 2013

(65) Prior Publication Data
US 2015/0043315 A1    Feb. 12, 2015

(51) Int. Cl.
| | |
|---|---|
| *G11B 13/08* | (2006.01) |
| *G11B 5/60* | (2006.01) |
| *G11B 5/31* | (2006.01) |
| *G11B 5/00* | (2006.01) |

(52) U.S. Cl.
CPC .............. *G11B 5/6088* (2013.01); *G11B 5/314* (2013.01); *G11B 5/3133* (2013.01); *G11B 2005/0021* (2013.01)

(58) Field of Classification Search
CPC ........... G11B 11/10534; G11B 5/3106; G11B 5/3133; G11B 5/314; G11B 2005/0021; G11B 13/08; G11B 5/4866
USPC ............... 360/59, 125.31, 125.41, 125.32; 369/13.33, 13.32
See application file for complete search history.

(56) References Cited

U.S. PATENT DOCUMENTS

| | | | |
|---|---|---|---|
| 7,272,079 B2 | 9/2007 | Challener | |
| 8,320,219 B1 * | 11/2012 | Wolf | G11B 5/314 360/125.74 |
| 8,320,220 B1 | 11/2012 | Yuan et al. | |
| 8,339,739 B2 | 12/2012 | Balamane et al. | |
| 8,391,108 B2 | 3/2013 | Peng et al. | |
| 8,406,094 B2 | 3/2013 | Matsuoto | |
| 8,451,705 B2 | 5/2013 | Peng et al. | |
| 8,514,673 B1 * | 8/2013 | Zhao | G11B 5/3133 369/13.33 |
| 9,053,737 B2 * | 6/2015 | Huang | G11B 13/08 |
| 2011/0205864 A1 * | 8/2011 | Huang | G02B 6/102 369/13.33 |
| 2012/0039155 A1 * | 2/2012 | Peng | G11B 5/314 369/13.14 |
| 2012/0045662 A1 * | 2/2012 | Zou | G11B 5/3133 428/810 |
| 2012/0218871 A1 | 8/2012 | Balamane et al. | |
| 2013/0107680 A1 * | 5/2013 | Contreras | G11B 13/04 369/13.32 |
| 2013/0148485 A1 * | 6/2013 | Jin | G11B 5/314 369/13.17 |

OTHER PUBLICATIONS

File History for U.S. Appl. No. 13/789,197 as retrieved from the U.S. Patent and Trademark Office on Apr. 25, 2014, 116 pages.

* cited by examiner

*Primary Examiner* — Thomas Alunkal
(74) *Attorney, Agent, or Firm* — Hollingsworth Davis, LLC

(57) ABSTRACT

A near-field transducer includes an enlarged region having a top side adjacent to a magnetic pole, a base side opposite the top side, and a circumference that extends from proximal to a media-facing surface to distal to a media-facing surface. The near-field transducer includes a peg region in contact with a region of the base side of the enlarged region, the peg region extending from the enlarged region towards the media-facing surface. The near-field transducer also includes a heat sink region having a contact side, a base side, and a circumference that extends from proximal to the media-facing surface to distal from the media-facing surface. The contact side of the heat sink region is in thermal contact with both the peg region and at least a region of the base side of the enlarged region.

20 Claims, 12 Drawing Sheets

NEAR-FIELD TRANSDUCER WITH ENLARGED REGION, PEG REGION, AND HEAT SINK REGION

SUMMARY

Embodiments are directed to a near-field transducer comprising an enlarged region having a top side adjacent to a magnetic pole, a base side opposite the top side, and a circumference that extends from proximal to a media-facing surface to distal from the media-facing surface. The near-field transducer also includes a peg region in contact with at least a portion of the base side of the enlarged region and extending from the enlarged region towards the media-facing surface and a heat sink having a contact side and a base side, and a circumference that extends from proximal to the media-facing to distal from the medial-facing surface. The contact side of the heat sink is in thermal contact with both the peg region and at least a portion of the base side of the enlarged region.

Embodiments are directed magnetic recording system comprising a hard drive slider that includes a near-field transducer. The near-field transducer comprises an enlarged region having a top side adjacent to a magnetic pole, a base side opposite the top side, and a circumference that extends from proximal to a media-facing surface to distal from the media-facing surface. A peg region is in contact with at least a region of the base side of the enlarged region and extends from the enlarged region towards the media-facing surface. A heat sink region has a contact side and a base side, and a circumference that extends from proximal to the media-facing to distal from the medial-facing surface. The contact side of the heat sink region is in thermal contact with both the peg region and at least a region of the base side of the enlarged region.

The above summary is not intended to describe each disclosed embodiment or every implementation of the present disclosure. The figures and the detailed description below more particularly exemplify illustrative embodiments

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
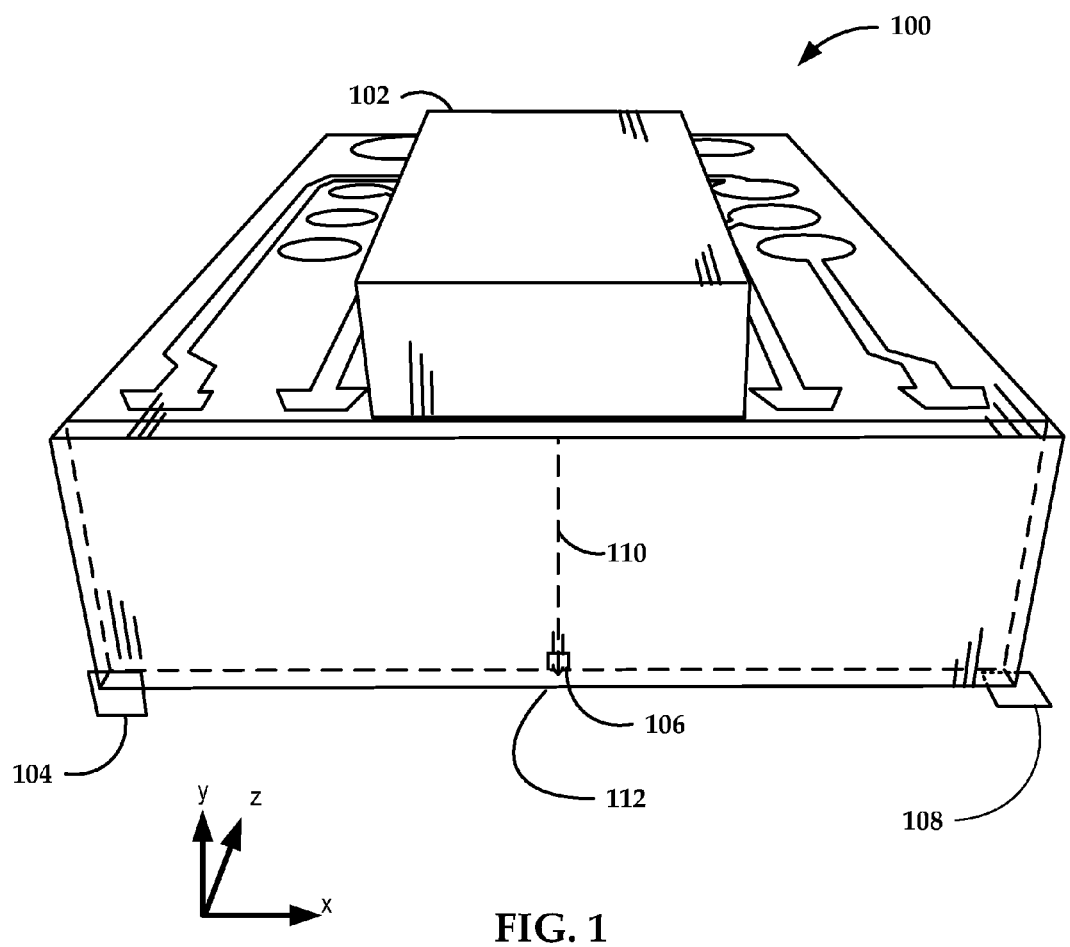
FIG. 1 is a perspective view of a hard drive slider that includes a disclosed near-field transducer.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various embodiments disclosed herein are generally directed to systems and apparatuses that facilitate coupling a laser diode to a magnetic writer that includes a magnetic write head. The systems and apparatuses include a plasmonic near-field transducer for heat-assisted magnetic recording (HAMR). Plasmonic near-field transducers can generate a large amount of heat in their writing tip. Disclosed are apparatuses and methods directed to managing heat buildup in the writing tip of plasmonic near-field transducers for heat-assisted magnetic recording.

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

One way to achieve a tiny confined hot spot is to use an optical near-field transducer (NFT), such as a plasmonic optical antenna or an aperture, located near an air-bearing surface of a hard drive slider. Light may be launched from a light source (e.g., a laser diode) into optics integrated into a slider. An example of such integrated optics includes a waveguide formed from core and cladding layers with high contrast between respective refractive indices. Light propagating in the waveguide may be directed to an optical focusing element, such as a planar solid immersion mirror (PSIM). The PSIM may concentrate the energy into a NFT. The NFT causes the energy to be delivered to the media in a very small spot.

A waveguide, NFT, and PSIM are examples of integrated optical devices that are formed within the slider. The field of integrated optics generally relates to the construction of optics devices on substrates, sometimes in combination with electronic components, to produce functional systems or subsystems. For example, light may be transferred between components via waveguides that are built up on a substrate using layer deposition techniques. These waveguides may be formed as a layer of materials, with a middle core layer having a relatively high refractive index, and top/bottom cladding layers of relatively low refractive index. Other optical components may be formed in similar fashion, including the NFT and PSIM discussed above.

In a HAMR slider, light is launched into these integrated optics components from a light source such as a laser diode. One way to launch light into a slider is from an externally mounted laser via an optical waveguide or grating coupler fabricated in a slider. Another way is to place a laser light source, such as a laser diode, into the slider, called laser-in-slider (LiS) light delivery. In laser-in-slider configurations, light is launched from the emitting facet of a laser diode into an optical waveguide. Laser-in-slider light delivery can be integrated at a wafer level and may be suitable for mass production.

FIG. 1 is a perspective view of a hard drive slider that includes a disclosed plasmonic near-field transducer (NFT). HAMR slider 100 includes laser diode 102 located on top of HAMR slider 100 proximate to trailing edge surface 104 of HAMR slider 100. Laser diode 102 delivers light proximate to read/write head 106, which has one edge on air-bearing surface (also referred to as "media-facing surface") 108 of HAMR slider 100. Air-bearing surface 108 is held proximate to a moving media surface (not shown) during device operation.

Laser diode 102 provides electromagnetic energy to heat the media at a point near to read/write head 106. Optical coupling components, such as a waveguide 110, are formed integrally within HAMR slider 100 to deliver light from laser diode 102 to the media. In particular, local waveguide 110 and NFT 112 may be located proximate read/write head 106 to provide local heating of the media during write operations. Laser diode 102 in this example may be an integral, edge-emitting device, although it will be appreciated that waveguide 110 and NFT 112 may be used with any light source and light delivery mechanisms. For example, a surface emitting laser (SEL) may be used instead of an edge firing laser.

While the example in FIG. 1 shows laser diode 102 integrated with HAMR slider 100, NFT 112 discussed herein may be useful in any type of light delivery configuration. For example, in a free-space light delivery configuration, a laser may be mounted externally to the slider, and coupled to the slider by way of optic fibers and/or waveguides. The slider in such an arrangement may include a grating coupler into which light is coupled and delivered to slider-integrated waveguide 110 which energizes NFT 112.

A HAMR device utilizes the types of optical devices described above to heat a magnetic recording media (e.g., hard disc) in order to overcome superparamagnetic effects that limit the areal data density of typical magnetic media. When writing to a HAMR medium, the light can be concentrated into a small hotspot over the track where writing takes place. The light propagates through waveguide 110 where it is coupled to NFT 112 either directly from the waveguide or by way of a focusing element. Other optical elements, such as couplers, mirrors, prisms, etc., may also be formed integral to the slider. The optical elements used in HAMR recording heads are generally referred to as integrated optics devices.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot is on the order of 50 nm or less. Thus the desired hot spot size is well below half the wavelength of the light. Optical focusers cannot be used to obtain the desired hot spot size, being diffraction limited at this scale. As a result, NFT 112 is employed to create a hotspot on the media.

NFT 112 is a near-field optics device designed to reach local surface plasmon resonance at a designed wavelength. A waveguide and/or other optical element concentrates light on a transducer region (e.g., focal point) where NFT 112 is located. NFT 112 is designed to achieve surface plasmon resonance in response to this concentration of light. At resonance, a high electric field surrounds NFT 112 due to the collective oscillations of electrons at the metal surface. Part of this field will tunnel into a storage medium and get absorbed, thereby raising the temperature of a spot on the media as it being recorded. NFTs generally have a surface that is made of a material that supports surface plasmons ("plasmonic metal") such as aluminum, gold, silver, copper, or alloys thereof. They may also have other materials but they must have a material that supports surface plasmons on their outer surface.

Figure 2:
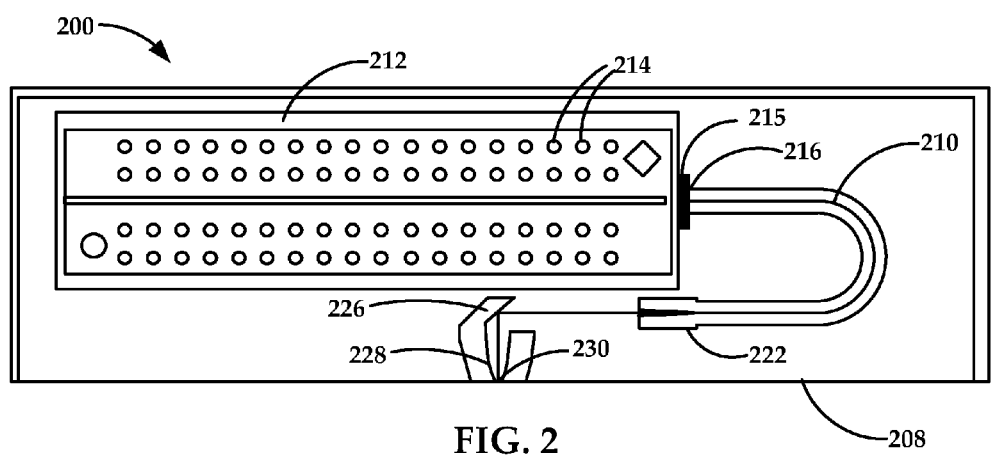
FIG. 2 is a more detailed front view of the hard drive slider shown in FIG. 1.

FIG. 2 is a front view of a disclosed apparatus showing electrical and optical interface features of slider assembly 200 that mates with an edge-emitting laser diode (e.g., laser diode 102 in FIG. 1). Cavity 212, solder bumps 214, waveguide input 216, waveguide 210, and air-bearing surface 208 seen here, were previously illustrated in FIG. 1. Solder bumps 214 on slider assembly 200 are configured to interface with the plurality of solder pads on the lower surface of a laser diode. The laser diode may include an output facet on one end that launches light into waveguide input 216 of waveguide 210 for delivery to the recording media. Integrated optics associated with light delivery may include coupling elements, beam expanders 222, collimators, focusing elements 226, such as PSIM, concentrating elements, 228 such as a plasmonic near-field transducer focused adjacent to focal point 230. Furthermore, located at the edge of cavity 212 between the laser diode and waveguide input 216 is gap 215. The size of gap 215 may depend on the alignment of the laser diode to cavity 212, but a typical size may be from about 0.25-1.0 μm and up to about 10 μm. Gap 215 may also have an aspect ratio of about 5 to 6. The aspect ratio is the ratio between depth of cavity 212 and the width of cavity 212.

NFTs that include an enlarged region and a peg region have been disclosed. In the context of describing an NFT, the term "region" is used interchangeably with "portion" and refers to a bounded three-dimensional feature in which the boundaries may either be physical boundaries or may be arbitrarily chosen for exemplary reasons. These NFTs can include a disk-shaped enlarged region that can be made of a plasmonic metal and is configured to receive light from a laser diode. The peg region is in optical and/or electrical communication with the disk-shaped enlarged region and I creates a focal point for the energy received by the enlarged region. In the context of describing an NFT, the term "disk" refers to three-dimensional shapes that include a cylinder, a base side, and a top side that may or may not be in a plane parallel with the base side.

Temperature increase inside the peg region of NFTs is a challenge in HAMR write heads. It would be desirable to design an NFT that has less of a temperature increase than NFTs known in the art. To reduce the temperature of the peg region of an NFT the thermal resistance of the peg should be reduced. However, the thermal resistance of the peg must also be reduced without substantially compromising the transducer performance (i.e. coupling efficiency). The coupling efficiency is the percentage of energy absorbed into the media surface, divided by the energy input at the incident plane of the PSIM from the energy source.

Also, related to the temperature increase is the thermal resistance. Thermal resistance of an object is directly proportional to the length of the object and inversely proportional to the cross-sectional area and thermal conductivity of the object (Fourier's Law). A typical material for constructing an NFT is gold, which has good mechanical and optical/plasmonic properties compared to other materials. Varying the NFT material may not substantially increase the thermal conductivity. Therefore, other means are required for reducing the thermal resistance of the peg region. In one aspect, to minimize thermal resistance the length of the peg region may be decreased. In another aspect, to minimize thermal resistance the cross-sectional area of the peg may also be increased. However, the cross-sectional area of the peg at the air-bearing surface, nearest the recording media, is dictated by the parameters required for magnetic recording. Additionally, specific wavelength of light from the laser diode dictates the size of the enlarged region of the NFT and the peg length in order to get optimal (maximum) coupling efficiency of the laser light to the NFT.

Figure 3:
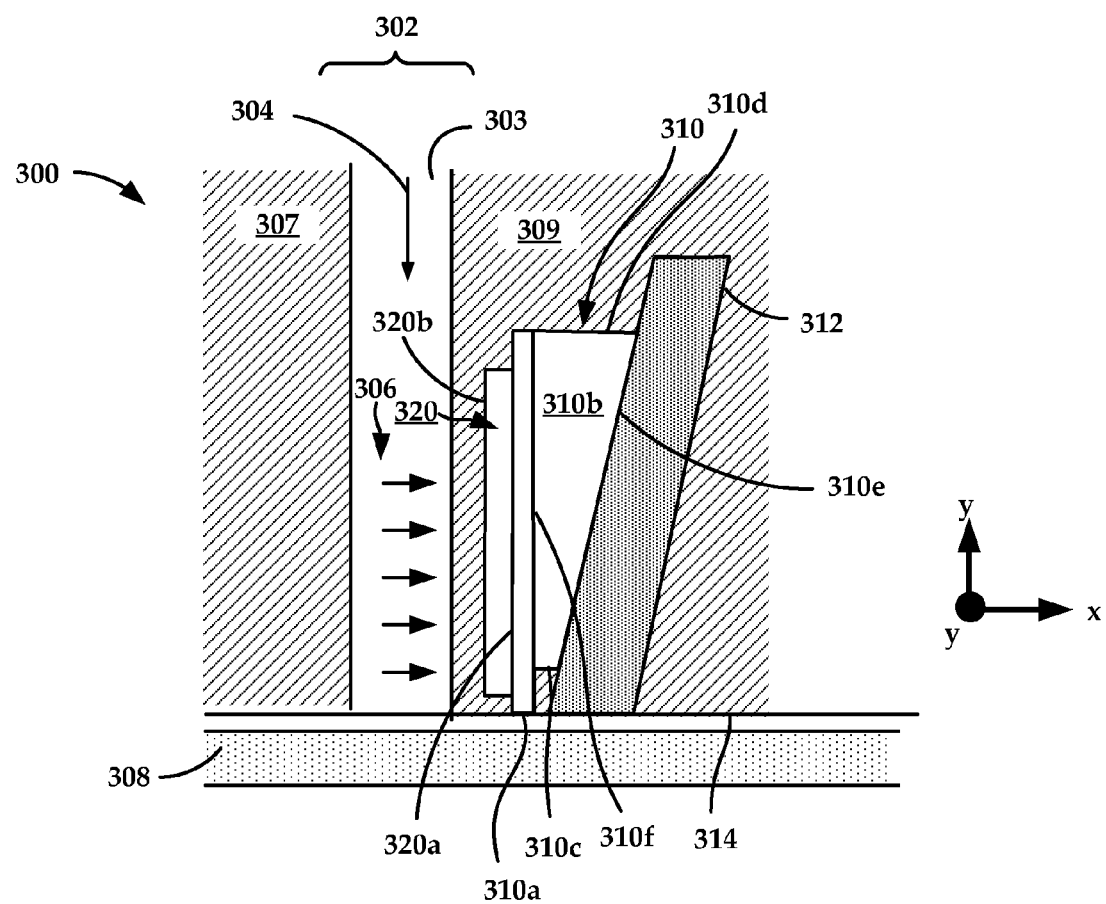
FIG. 3 is a side cross-sectional view of a provided near-field transducer and waveguide according to an example embodiment.

The present disclosure relates to systems and apparatuses that include plasmonic near-field transducers. FIG. 3 is a side cross-sectional view of an exemplary provided near-field transducer and waveguide according to an example embodiment that illustrates features disclosed herein. In reference now to FIG. 3, a cross-sectional view shows details of an NFT 310 and waveguide 302 of a HAMR apparatus 300 according to an example embodiment. The NFT 310, waveguide 302, and other components are built on a substrate plane, which is parallel to the xy-plane in this view. NFT 310 is located proximate a media-facing surface 314 (e.g., ABS), which is held near a recording medium 308 during device operation, e.g., magnetic disk. In the orientation of FIG. 3, the media-facing surface 314 is arranged parallel to the x-y plane. Elongated waveguide core 303 may be disposed proximate the NFT 310, NFT 310 being located at or near the media-facing surface 314.

Waveguide core 303 is shown configured as a planar waveguide, and is surrounded by cladding layers 307 and 309 that have different indices of refraction than core 303. Other waveguide configurations may be used instead of a planar waveguide, e.g., channel waveguide. Light 304 propagates through the waveguide core 303 along the negative y-direction. Electrical field lines 306 emanate from the waveguide core 303 and excite NFT 310. NFT 310 delivers surface plasmon-enhanced, near-field electromagnetic energy along the negative y-direction where it exits at the media-facing surface 314. This may result in a highly localized hot spot (not shown) on media 308. Further illustrated in FIG. 3 is magnetic recording pole 312 that is located alongside NFT 310. Magnetic pole 312 generates a magnetic field (e.g., perpendicular field) used in changing the magnetic orientation of the hotspot during writing.

NFT 310 includes enlarged region 310b of plasmonic material (e.g., gold, silver, copper, and combinations or alloys thereof). Enlarged region 310b has top side 310e adjacent to magnetic pole 312, base side 310f opposite top side 310e, and a circumference that extends from proximal 310c to media-facing surface 314 to distal the media-facing surface 310d (for example, along the y-axis). The NFT 310 further includes peg region 310a of plasmonic material that is in contact with at least a portion of base side 310f of enlarged region. Peg region 310a extends from enlarged region 310b towards media-facing surface 314. As will be described in greater detail below, the projection of enlarged region 310b onto the xy-plane is narrowed at the output end.

NFT 310 also includes heat sink 320. Heat sink 320 has contact side 320a, base side 320b and a circumference that extends from proximal media-facing surface 314 to distal from media-facing surface 314 in a manner analogous to that of enlarged region 310b. Contact side 320a of heat sink 320 is in thermal contact with both peg region 310a and at least a portion of base side 310f of enlarged region 310. FIG. 3 shows a line between enlarged region 310b and peg region 310a. This line is for illustrative purposes only. Commonly, enlarged region 310b and enlarged region 310a are one piece and make up NFT 310. Thus, peg region 310a may extend from part of the circumference of NFT 310 as will be illustrated later.

NFT 310 is excited by a waveguide mode of the planar waveguide 302, polarized with dominant electric field 306 normal to the plasmonic metal surfaces of the NFT 310, e.g. circumference of enlarged region 310b. Enlarged region 310b also includes top side 310e that faces, and in this example directly contacts, magnetic pole 312. Enlarged region 310b of NFT 310 is shaped to condense the field and the peg 310a is designed to resonate such that the NFT efficiency is enhanced on one hand, and on the other hand scattering of the field is reduced along the circumference of the enlarged region 310b.

Excitation of NFT 310 may occur over a large region of enlarged region 310b and heat sink region 320, however, there is no limitation as to where or how NFT 310 may be excited by energy delivered by the waveguide 302. Generally, it will be understood that NFT 310 is designed to direct the surface plasmons from the output end of peg region 310a to media 308 when media 308 is proximate to the media-facing surface 314. The end peg region 310a protrudes out from elongated region 310b near media-facing surface 314. This protrusion can improve NFT efficiency and thermal gradient for writing sharp magnetic transitions. Surface plasmon waves are generated mainly at surfaces of peg region 310a and enlarged region 310b nearest planar waveguide core 303. The tip of the peg region may have different cross-section and or size from the body of the peg region.

Figure 4A:
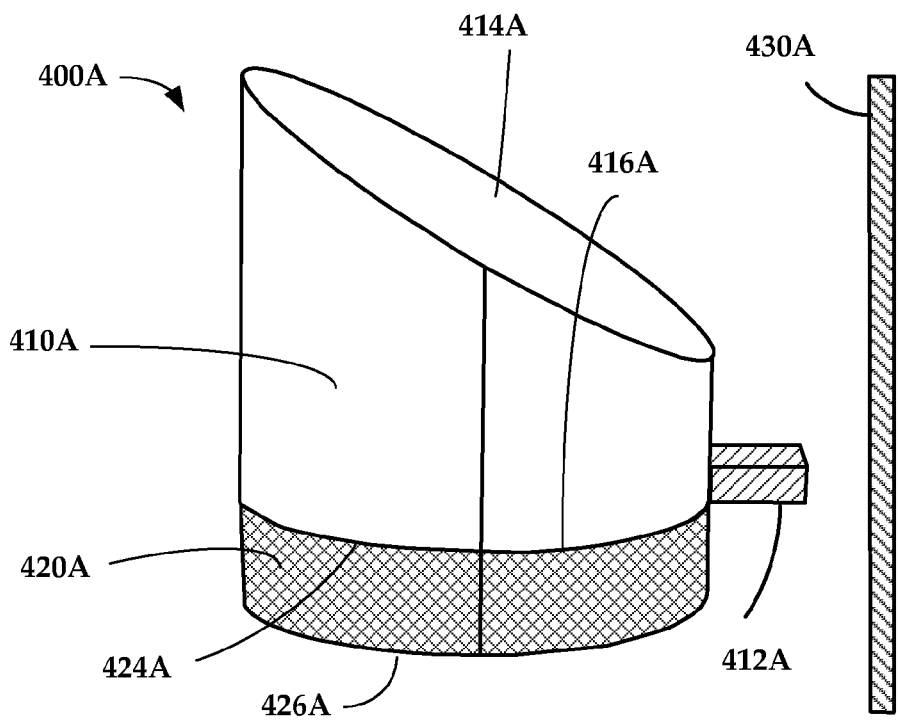
FIGS. 4A-4C are plan views of embodiments of provided near-field transducers.
Figure 4B:
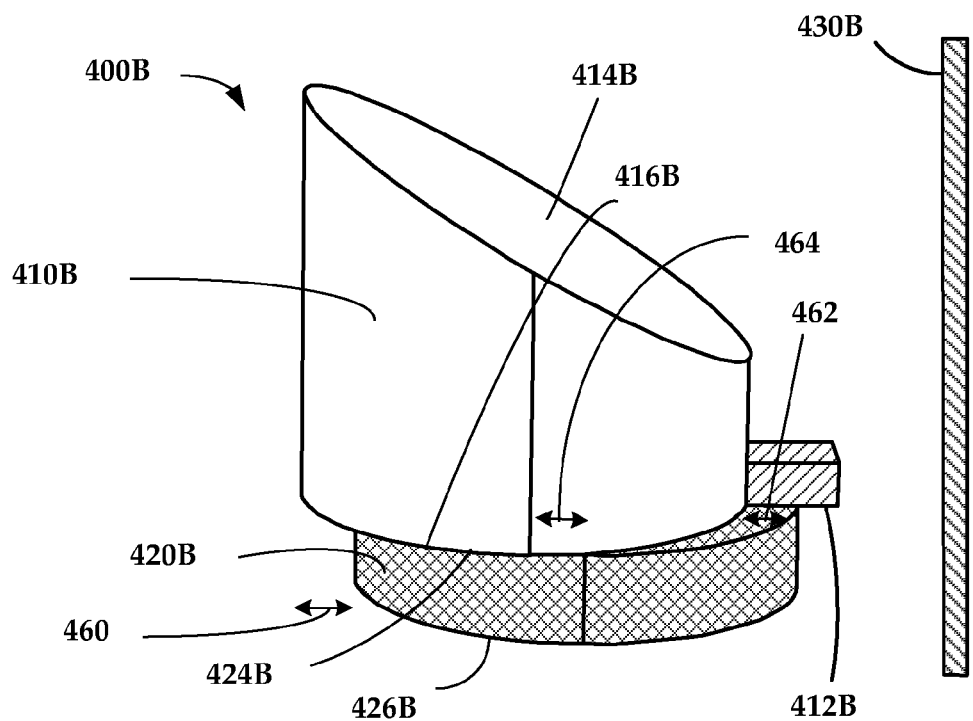
Figure 4C:
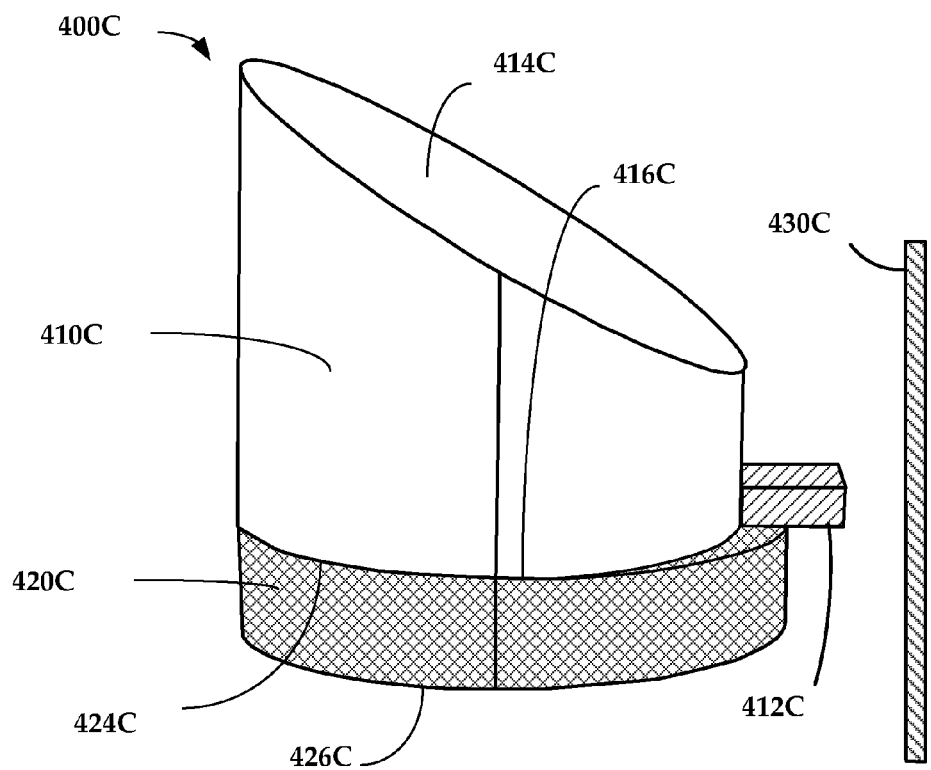

The waveguide mode is $TE_{00}$, which is fundamental and transverse-electric polarized. The dominant electric field 306 is along x-direction and normal to base side 310f of enlarged region 310. The mode index of dielectric waveguide 302 is close to that of the surface-plasmon waves, therefore surface-plasmon waves are efficiently excited on enlarged region 310b and heat-sink region 320. The elongated peg 310a functions as a monopole antenna. At resonance, it interacts with the dielectric waveguide mode as well as the surface-plasmon waves generated on the circumferences of enlarged region 310b and heat sink region 320, which pulls the field toward itself and delivers the optical energy into the recording media 308. The presence of heat sink 320 helps to increase the coupling efficiency and to reduce the temperature of the writing tip of peg region 310a FIGS. 4A-4C are plan views of various embodiments of provided NFTs. FIG. 4A is an illustration of one embodiment, 400A. NFT 400A includes enlarged region 410A that has top side 414A adjacent to a magnetic pole (not shown) and base side 424A opposite (but not necessarily parallel to) top side 414A. Enlarged region has a circumference that extends from proximal media-facing surface 430A to distal media-facing surface 430A. In the embodiment illustrated in FIG. 4A, the circumference is cylindrical, having a cross-section parallel to the base side of the enlarged region that is circular, however other shapes of enlarged region are also contemplated. In some embodiments, the circumference can be conical. In some embodiments, the circumference of the enlarged region may be elliptical.

When the circumference of the enlarged region has circular or elliptical cross-section, the enlarged region can be sometimes referred to as a disk. In some embodiments, a plane that includes the top side of the enlarged region can be at an angle with respect to a plane that includes the base side of the enlarged region. In some other embodiments, the circumference of the enlarged region may be the sides of a regular or irregular rectangular or triangular parallelepiped having a cross-section that is a square, rectangle, triangle, regular or irregular polygon. In some embodiments, the area of the top side of the enlarged region is substantially the same as the area of the base side of the enlarged region. More complex geometrical shapes of the enlarged region can also be within the scope of this disclosure.

NFT 400A also has peg region 412A that is in contact with at least a portion of base side 424A of enlarged region 410A and extends from enlarged region 410A towards media-facing surface 430A. As shown in FIG. 3, peg region 412A is an extension of enlarged region 410A. FIG. 4A shows the end of peg region 412A (the region closest to media-facing surface 430A) as having a non-tapered end. However, the end may be tapered to provide a smaller surface area at the tip of the peg region to better focus the energy from the NFT onto a small spot on the media.

NFT 400A includes heat sink 420A that has contact side 424A and base side 426A. Heat sink 420A also has a circumference that extends from proximal media-facing surface 430A to distal media-facing surface 430A. Contact side 424A of heat sink 420A is in thermal contact with both peg region 412A and at least a portion of base side 424A of enlarged region 410A. When the circumference of the heat sink region is circular or elliptical, the heat sink region can be sometimes referred to as a disk. In some embodiments, the area of the contact side of the heat sink region is the same as the area of the base side of the heat sink region.

FIG. 4B is an illustration of another embodiment of a provided NFT. NFT 400B includes enlarged region 410B that has top side 414B adjacent to a magnetic pole (not shown) and base side 424B opposite (but not necessarily parallel to) top side 414B. Enlarged region 410B has a circumference that extends from proximal media-facing surface 430B to distal media-facing surface 430B. NFT 400B also has peg region 412B that is in contact with at least a region of base side 424B of enlarged region 410B and extends from enlarged region 410B towards media-facing surface 430B. NFT 400B includes heat sink 420B that has contact side 424B and base side 426B. Heat sink 420B also has a circumference that extends from proximal media-facing surface 430B to distal media-facing surface 430B. Contact side 424B of heat sink 420B is in thermal contact with both peg region 412B and at least a portion of base side 424B of enlarged region 410B. The circumference of enlarged region 410B proximal to media-facing surface 430B is offset in a direction away from media-facing surface 430B with respect to heat sink 420B as shown in FIG. 4B. Also the circumference of enlarged region 410B distal to media-facing surface 430B is offset away from media-facing surface 430B with respect to heat sink 420B.

FIG. 4C is an illustration of another embodiment of a provided NFT. NFT 400C includes enlarged region 410C that has top side 414C adjacent to a magnetic pole (not shown) and base side 424C opposite (but not necessarily parallel to) top side 414C. Enlarged region has a circumference that extends from proximal media-facing surface 430C to distal media-facing surface 430C. NFT 400C also has peg region 412C that is in contact with at least a region of base side 424C of enlarged region 410C and extends from enlarged region 410C towards media-facing surface 430C. NFT 400C includes heat sink 420C that has contact side 424C and base side 426C. Heat sink 420C also has a circumference that extends from proximal media-facing surface 430C to distal media-facing surface 430C. Contact side 424C of heat sink 420C is in thermal contact with both peg region 412C and at least a portion of base side 424C of enlarged region 410C. The circumference of enlarged region 410C proximal to media-facing surface 430C is offset in a direction away from media-facing surface 430C with respect to heat sink 420C as shown in FIG. 4C. The circumference of enlarged region 410C distal to media-facing surface 430C is not offset from media-facing surface 430C with respect to the circumference of the heat sink region 420C proximal to media-facing surface 430C.

The enlarged region and the peg region of disclosed near-field transducers can comprise a substrate which has been at least partially covered with a thin layer of plasmonic material. The substrate can comprise any material capable of supporting a thin layer of plasmonic material. Typical substrates include silicon wafers, inorganic and organic dielectrics, polymer dielectrics, glass, non-conductive metals and ceramics. Typical plasmonic materials include at least one of aluminum, silver, copper, gold, and alloys thereof. Gold is a typically used material due to its good mechanical properties, coupling efficiency and its ability to generate surface plasmons. The heat sink region can include materials that have a high heat conductivity. Materials useful for the heat sink region include gold, silver, or alloys thereof.

During the operation of the plasmonic near-field transducer, the plasmonic near-field transducer experiences a temperature rise. Modeling (finite element analysis of heat flow) has shown that the temperature rise is highest in the peg region of the near-field transducer. The models indicate that the electromagnetic field generated within the near-field transducer during the recording operation is highest within the peg region. Models show that the amplitude of the electromagnetic field is directly proportional to the energy absorption level. The disclosed plasmonic near-field transducers may include a heat sink region for cooling the NFT through improved heat dissipation from the peg region to the heat sink region.

Figure 4D:
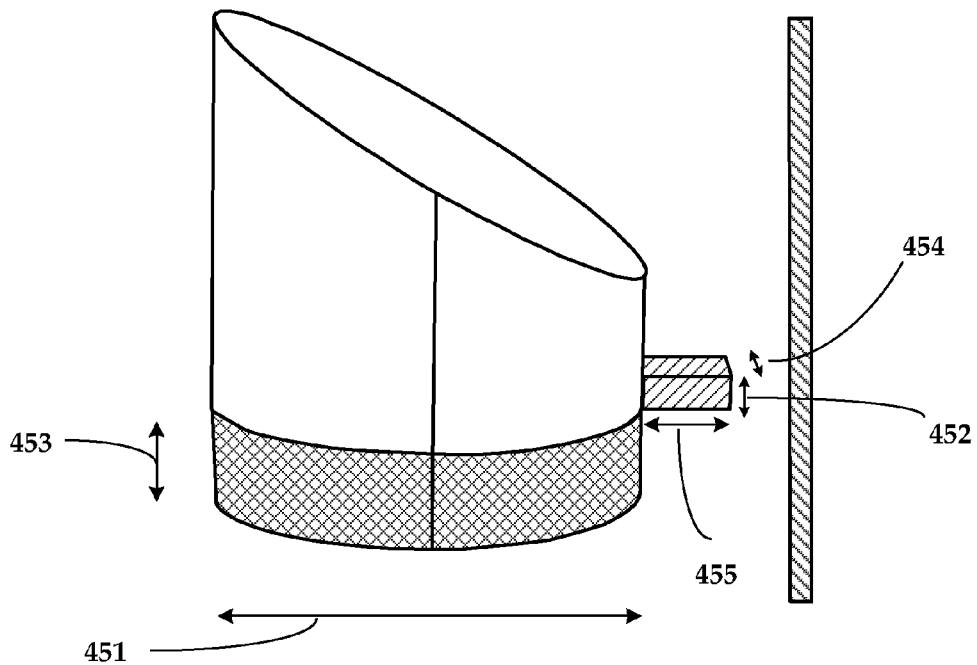
FIG. 4D is a plan view of FIG. 4A with various modeled parameters identified.

Finite element analysis of various near-field transducer configurations was performed to identify the most important structural features of the near-field transducers that provide for improved (e.g., maximum) performance efficiency in HAMR recording heads. The responses of interest were recording media to recording head temperature ratio ("MH" ratio), thermal gradient ("TG"), and full width at 80% maximum thermal spot size ("FW80") in the media heated with the modeled transducers. Based upon modeling, it was determined that NFTs with a combination of higher MH ratio, and lower TG and FW80, provide for improved performance efficiency. The models were based upon designs of provided near-field transducers made in $SiO_2$. The modeled NFTs had circular cross-sections and were generally for the structure of NFT illustrated in FIG. 4A. For the different models with results disclosed herein, the variables were heat sink disk diameter in nm (451 in FIG. 4D), peg thickness in nm (452 in FIG. 4D), thickness of heat sink with various peg thicknesses (453 in FIG. 4D), peg width in nm (454 in FIG. 4D) and peg length from the break point in nm (455 in FIG. 4D). In the modeled NFT, the disk diameter was 280 nm, the peg height was 20 nm, the peg thickness was 25 nm, and the closest distance of the sunken region to the waveguide core was 25 nm. In this disclosure, the term "break point" refers to the location in a peg region of a near-field transducer that is on the circumference of the enlarged region of a near-field transducer nearest to an air-bearing surface.

Figure 5A:
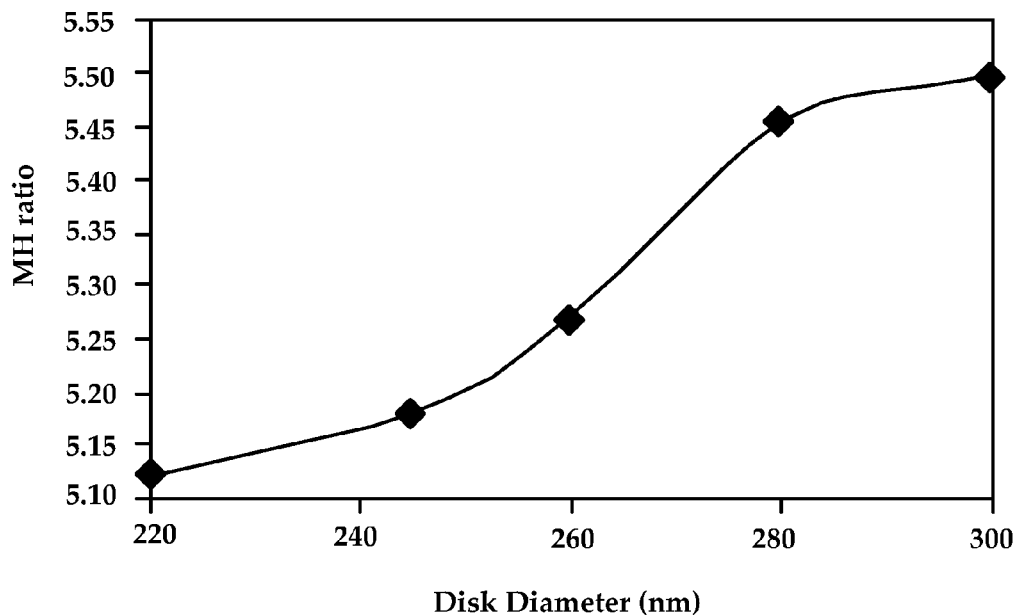
FIGS. 5A-5D are graphs of media to head temperature ("MH") ratio, thermal gradient ("TG"), full width at 80% maximum ("FW80"), and temperature rise vs. heat sink disk diameter (in nm) for an embodied provided near-field transducer.
Figure 5B:
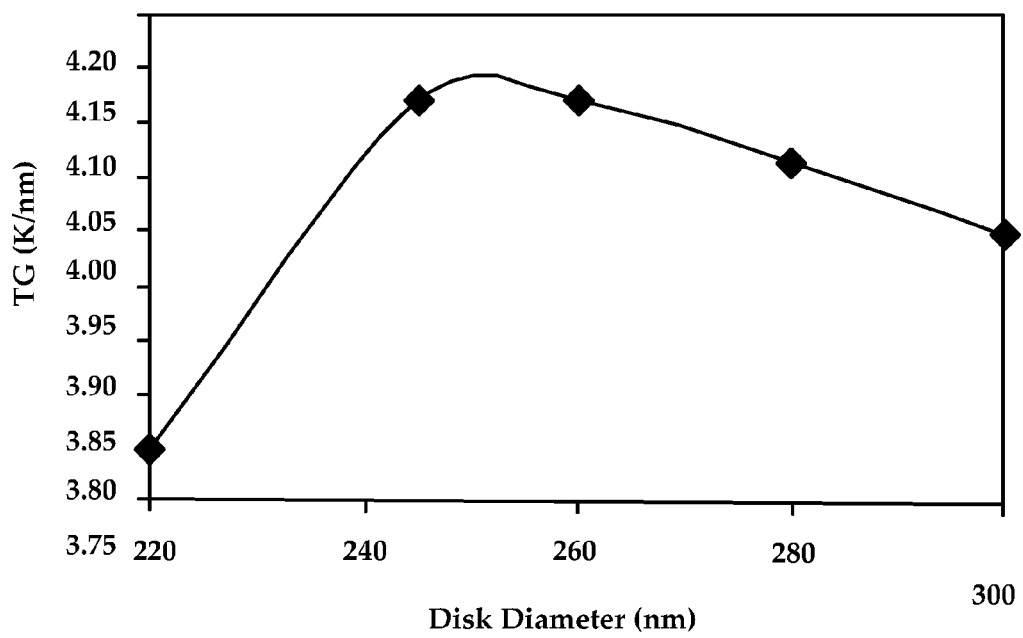
Figure 5C:
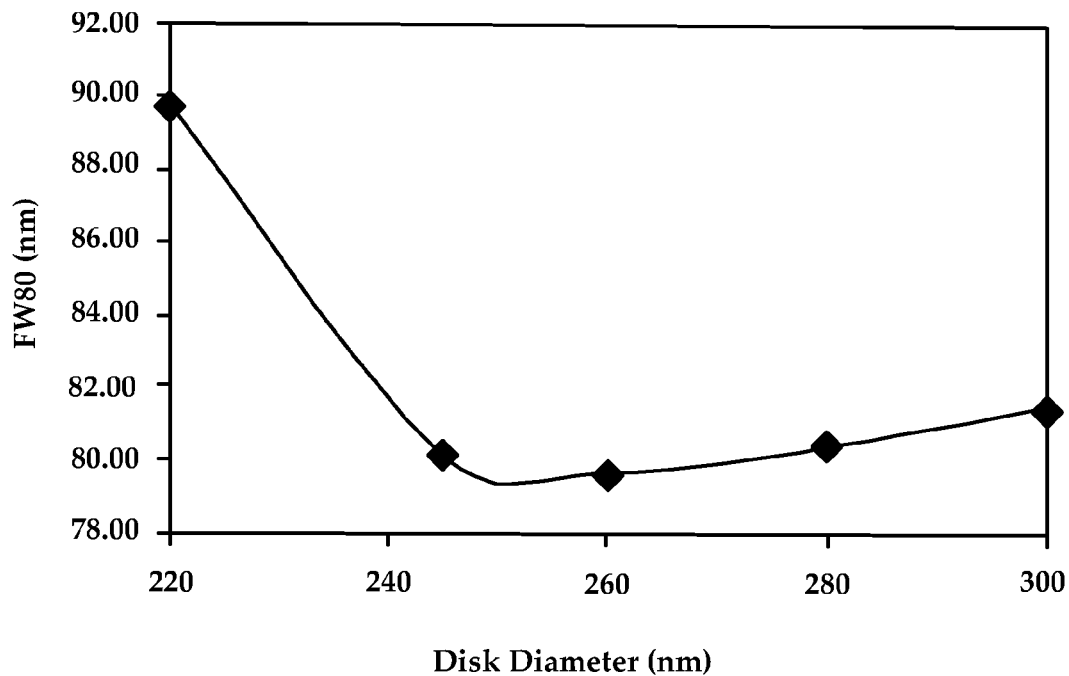
Figure 5D:
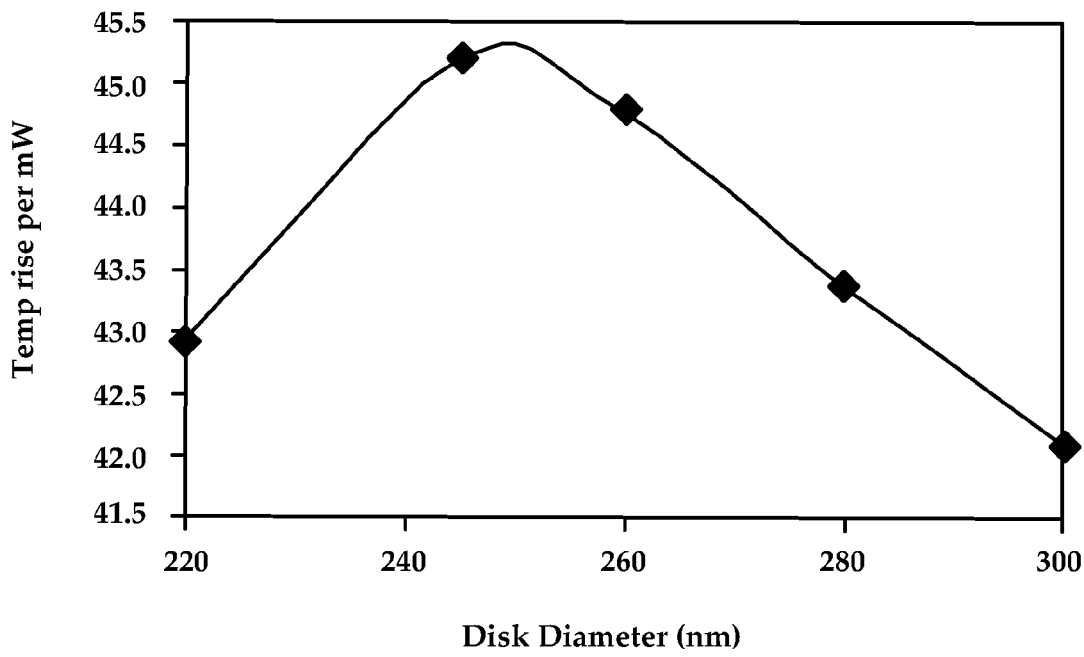

FIGS. 5A-5C show the modeled effect of heat sink disk diameter on MH ratio, TG, and FW80 for a silica NFT as illustrated in FIG. 4A. FIG. 5D illustrate the relationship of heat sink disk diameter to temperature rise per mW of input laser power. To maximize MH, temperature rise per mW input laser power, and to minimize FW80, it can be seen that a disk diameter of from about 150 nm to about 350 nm, from about 240 nm to about 260 nm, or about 250 nm gives the best combination of desired properties.

Figure 6A:
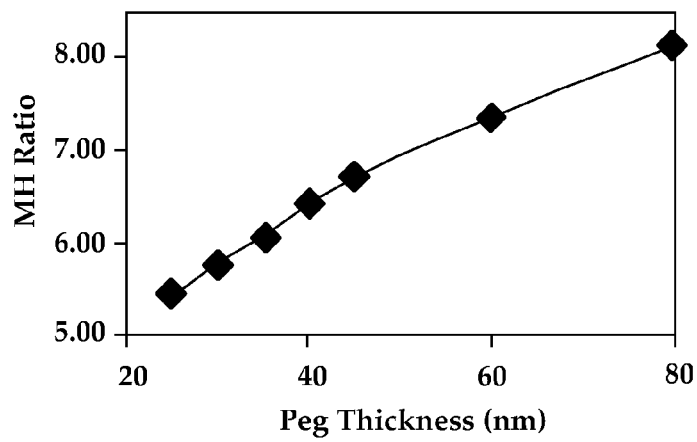
FIGS. 6A-6C are graphs of MH ratio, TG, and FW80 ratio vs. peg thickness for an embodied provided near-field transducer.
Figure 6B:
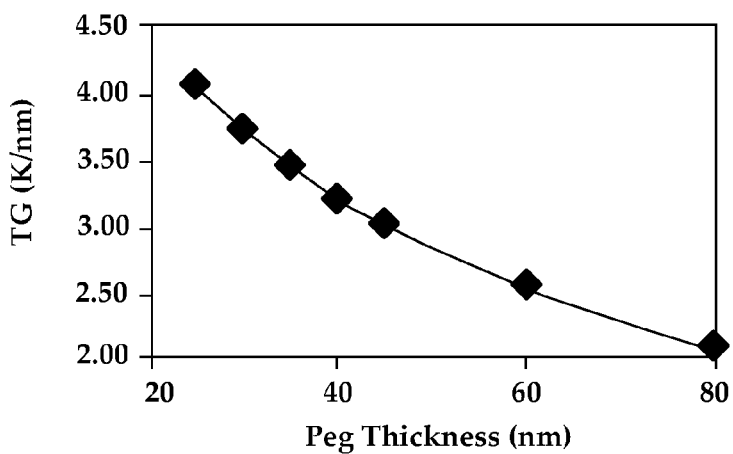
Figure 6C:
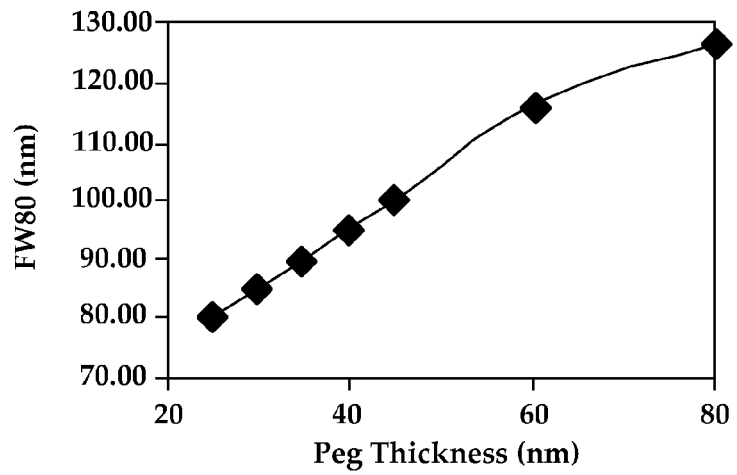

FIGS. 6A-6C show the modeled effect of peg thickness on MH ratio, TG, and FW80 for a silica NFT as illustrated in FIG. 4A. In order to maximize MH ratio and TG and to minimize FW80, the best peg thickness is from about 25 nm to about 40 nm, or about 35 nm.

Figure 7A:
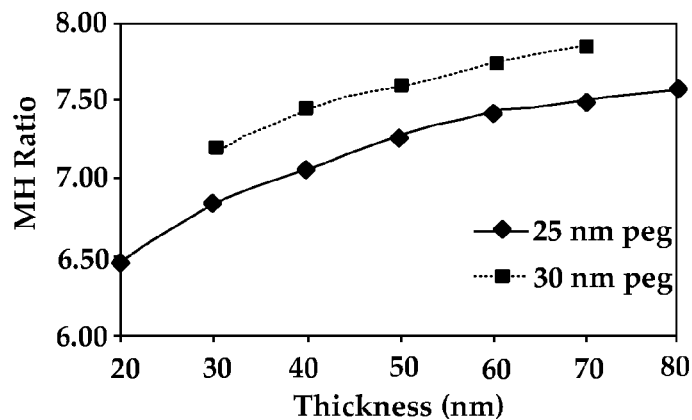
FIGS. 7A-7C are graphs of MH ratio, TG, and FW80 vs. heat sink disk thickness (in nm) for an embodied provided near-field transducer.
Figure 7B:
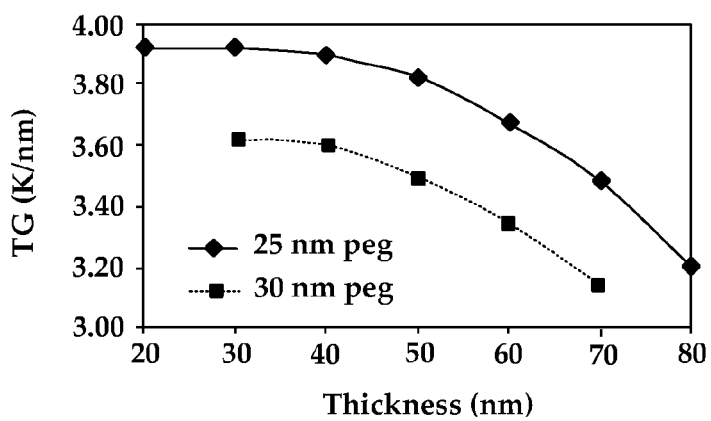
Figure 7C:
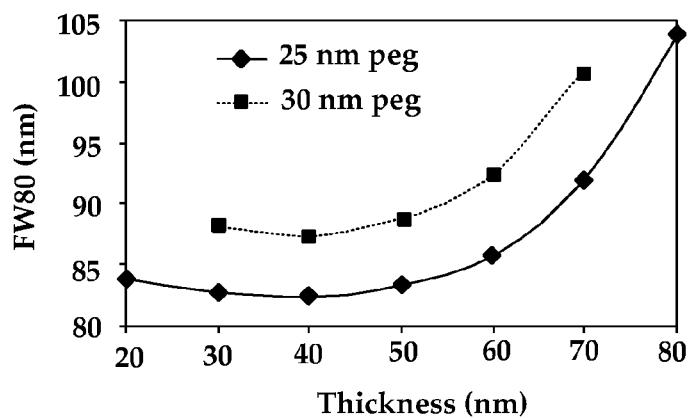

FIGS. 7A-7C show the modeled effect of heat sink disk thickness on MH ratio, TG, and FW80 for two different peg thicknesses (25 nm and 30 nm). The 30 nm thick peg is seen to have a higher MH ratio but lower TG for all thicknesses of heat sink disks. A thicker peg gives a larger thermal spot (FW80). In order to maximize MH ratio and TG and to minimize FW80, a heat sink disk thickness of from about 10 nm to about 80 nm, from about 30 nm to about 60 nm, from about 35 nm to about 40 nm, or about 35 nm is desired along with a peg thickness of from about 25 nm to about 30 nm.

Figure 8A:
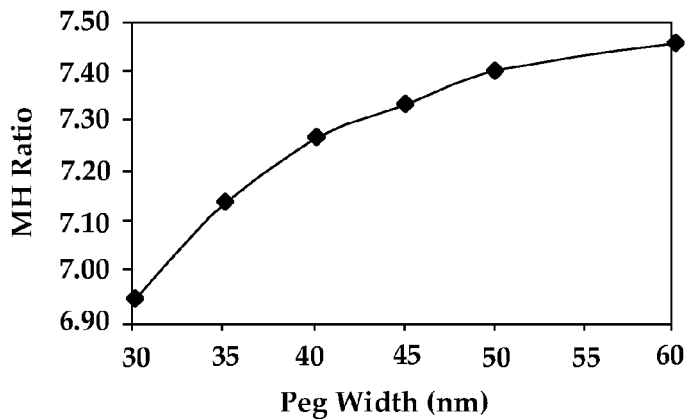
FIGS. 8A-8C are graphs of MH ratio, TG, and FW80 vs. peg width for an embodied provided near-field transducer.
Figure 8B:
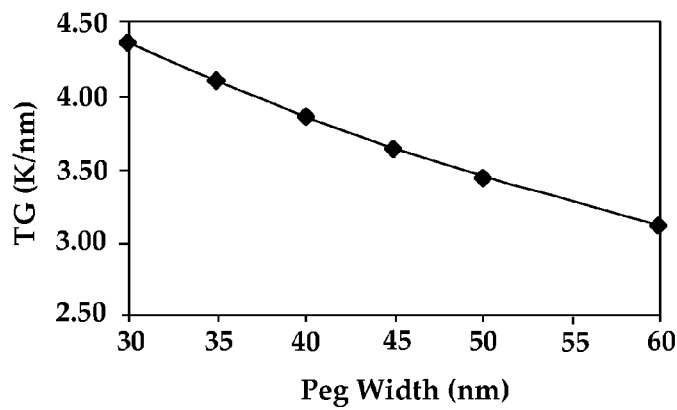
Figure 8C:
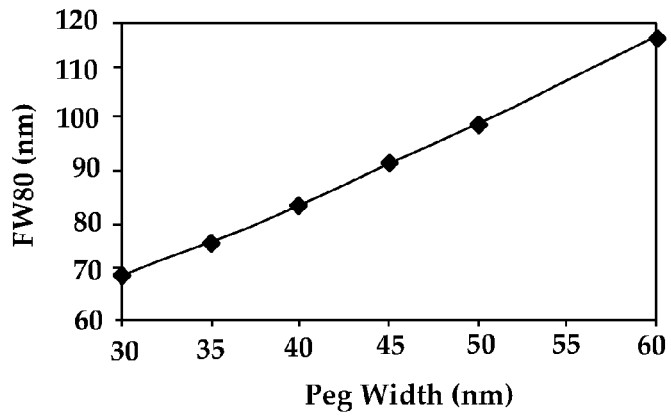

FIGS. 8A-8C show the modeled effect of peg width on MH ratio, TG, and FW80. To maximize MH ratio and TG, and minimize FW80, a peg width of from about 35 nm to about 40 nm or, about 35 nm has the best combination of properties.

Figure 9A:
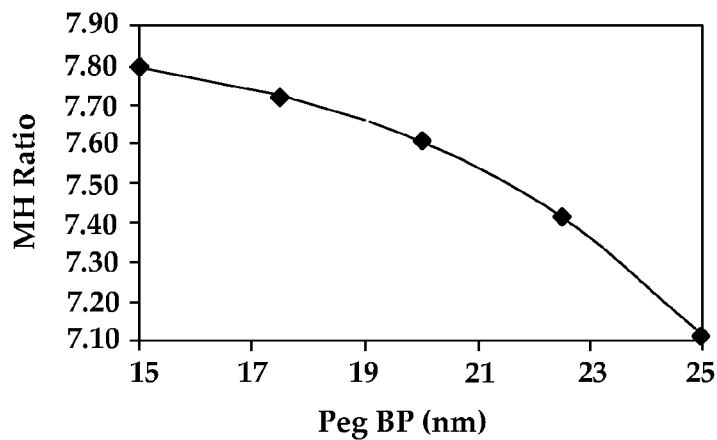
FIGS. 9A-9C are graphs of MH ratio, TG, and FW80 vs. peg break point length (in nm) for an embodied provided near-field transducer.
Figure 9B:
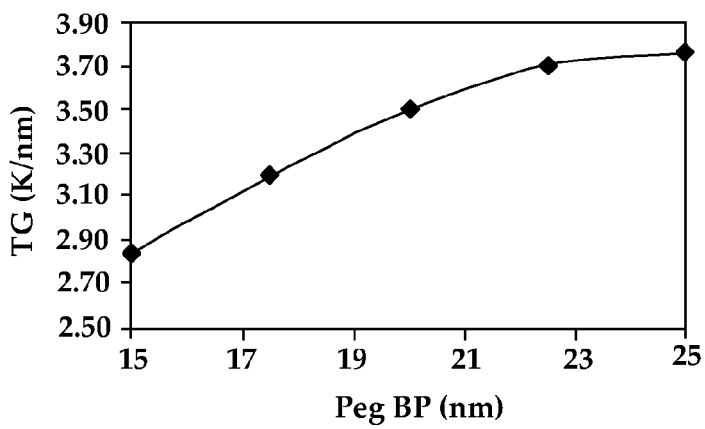
Figure 9C:
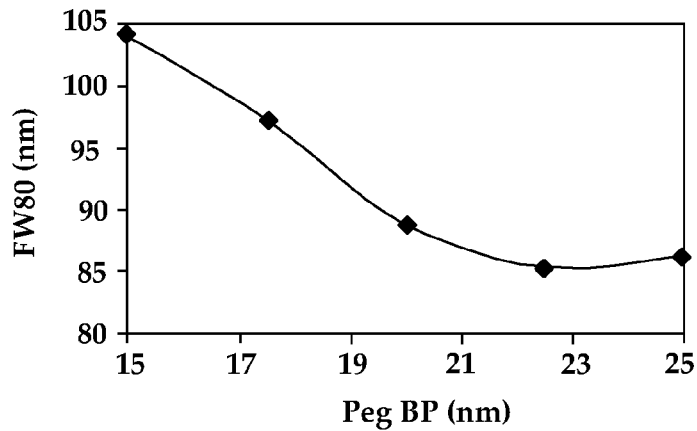
Figure 10A:
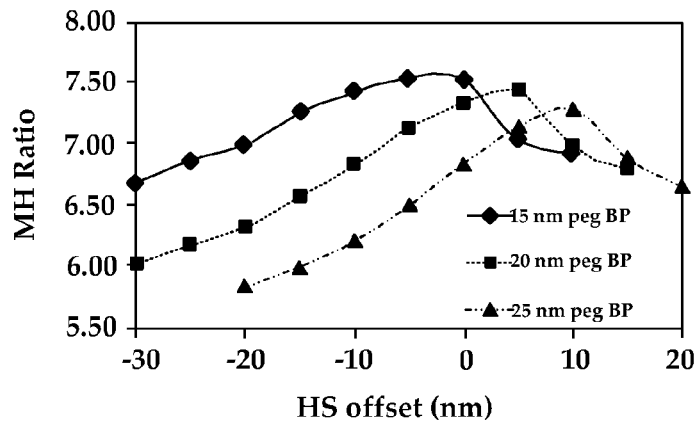
FIGS. 10A-10C are graphs of MH ratio, TG, and FW80 vs. HF offset as a function of various peg lengths (in nm) for an embodied provided near-field transducer.
Figure 10B:
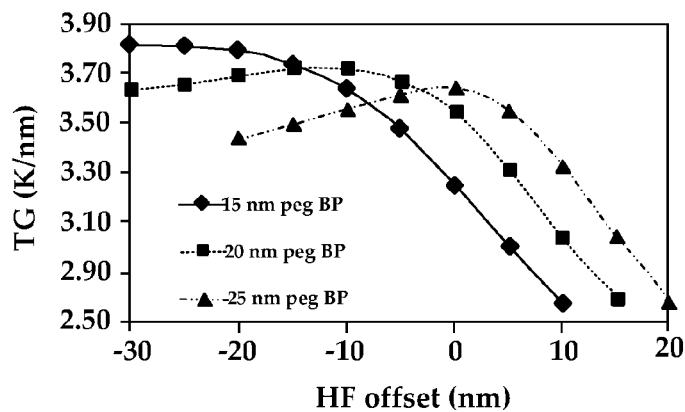
Figure 10C:
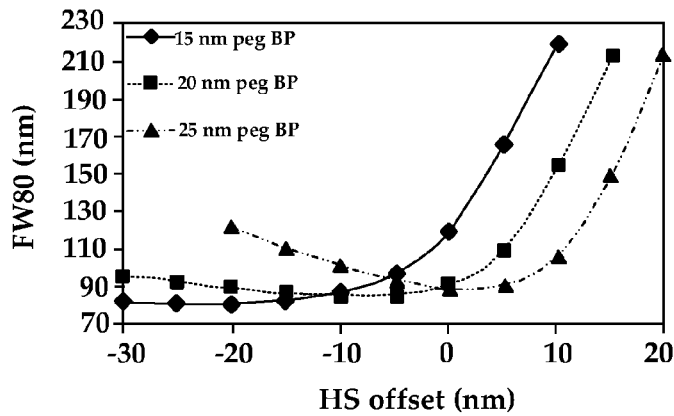

FIGS. 9A-9C show the modeled effect of peg length from the break point ("Peg BP") on MH ratio, TG, and FW80. Here the MH ratio is highest at a lower peg length from the break point, but the TG and FW80 increase with higher peg length from the break point. The peg region can extend from about 10 nm to about 30 nm from the break point on the enlarged region of the NFT.

NFT configurations that have an offset (shown as 464 in FIG. 4B) of the center of the enlarged region with respect to the center of the heat sink disk as shown in FIG. 4B were modeled as a function of three different peg lengths from the break point ("peg BP")—15 nm, 20 nm, and 25 nm. An offset of 0 indicates that the heat sink region lines up with the enlarged region as shown in FIG. 4A. A positive offset indicates the enlarged region of the NFT is offset towards the media-facing surface. A negative offset indicates the enlarged region of the NFT is offset away from the media-facing surface. The heat sink disk diameter was 280 nm, the heat sink disk thickness was 50 nm, the peg thickness was 25 nm, and the peg width was 45 nm. The overmill (shown as 462 in FIG. 4B) was 6 nm. The modeling results show a 15 nm peg length to break point with a −20 nm heat sink offset gives the best reliability of performance.

The effect of overhang of the enlarged region of the NFT compared to the heat sink region (460 in FIG. 4B) was modeled using an NFT with a structure as shown in FIG. 4B with a various heat sink disk diameters, a heat sink thickness of 50 nm, a peg thickness of 25 nm, a peg width of 45 nm, a peg length from the break point of 15 nm, an offset of −15 nm, with an overmill of 6 nm, and various overhangs in which the distal circumference of the enlarged region of the NFT overhangs the distal circumference of the heat sink region of the NFT (see 460 in FIG. 4B). Table 1 shows the modeled MH ratio, TG, and FW80 as a function of heat sink diameter and subsequently overhang.

TABLE 1

Modeled MH ratio, TG, and FW80 Changes as Function of Overhang

| HS Diameter (nm) | Overhang (nm) | MH ratio | TG | FW80 |
|---|---|---|---|---|
| 265 | 0 | −3.45% | +1.37% | −1.94% |
| 280 | 15 | 0 | 0 | 0 |
| 310 | 45 | +2.74% | −3.20% | −3.22% |

The data in Table 1 show that overhang can improve the MH ratio but reduce TG and increase FW80.

All references and publications cited herein are expressly incorporated herein by reference in their entirety into this disclosure except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. A near-field transducer comprising:
    an enlarged region having a top side adjacent to a magnetic pole, a base side opposite the top side, and a circumference that extends from proximal to a media-facing surface to distal from the media-facing surface;
    a peg region in contact with at least a region of the base side of the enlarged region and extending from the enlarged region towards the media-facing surface; and
    a heat sink region having a contact side and a base side, and a circumference that extends from proximal to the media-facing to distal from the medial-facing surface, wherein the contact side of the heat sink region is in physical contact with both the peg region and at least a region of the base side of the enlarged region, and the heat sink is formed from plasmonic material and configured to enhance coupling efficiency of the near-field transducer.

2. A near-field transducer according to claim 1, wherein the base side of the enlarged region, the base-side of the heat sink region, or both have a circular, elliptical, or rectangular cross-section.

3. A near-field transducer according to claim 2, wherein a plane that includes the top side of the enlarged region is at an angle with respect to a plane that includes the base side of the enlarged region.

4. A near-field transducer according to claim 2, wherein the enlarged region, the heat sink region, or both are in the shape of a disk.

5. A near-field transducer according to claim 4, wherein the area of the top side of the enlarged region is the same as the area of the base side of the enlarged region.

6. A near-field transducer according to claim 4, wherein the area of the contact side of the heat sink region is the same as the area of the base side of the heat sink region.

7. A near-field transducer according to claim 1, wherein the circumference of the enlarged region distal to the media-facing surface is offset in a direction away from the media-facing surface of the disk-like heat sink with respect to the circumference of the heat sink distal to the media-facing surface.

8. A near-field transducer according to claim 1, wherein the circumference of the enlarged region proximal to the media-facing surface is offset in a direction away from the media-facing surface of the disk-like heat sink with respect to the circumference of the heat sink region proximal to the media-facing surface.

9. A near-field transducer according to claim 1, wherein the enlarged region and the peg region comprise a plasmonic metal.

10. A near-field transducer according to claim 9, wherein the plasmonic metal comprises at least one of gold, copper, silver, aluminum, or an alloy thereof.

11. A near-field transducer according to claim 10, wherein the plasmonic near-field transducer comprises gold.

12. A near-field transducer according to claim 1, wherein the heat sink region comprises a disk having a diameter of from about 150 nm to about 350 nm.

13. A near-field transducer according to claim 1, wherein the heat sink region comprises a disk having a diameter of from about 240 nm to about 300 nm.

14. A near-field transducer according to claim 1, wherein the peg region extends from about 10 nm to about 30 nm from the break point on the enlarged region.

15. A near-field transducer according to claim 1, wherein the peg region has a thickness of from about 20 nm to about 40 nm.

16. A near-field transducer according to claim 1, wherein the peg region has a width of from about 10 nm to about 80 nm.

17. A near-field transducer according to claim 1, wherein peg region has a width of from about 30 nm to about 60 nm.

18. A near-field transducer according to claim 1, wherein the heat sink region has a thickness of from about 30 nm to about 50 nm.

19. A magnetic recording system comprising:
a hard drive slider including a near-field transducer, the near-field transducer comprising:
an enlarged region having a top side adjacent to a magnetic pole, a base side opposite the top side, and a circumference that extends from proximal to a media-facing surface to distal from the media-facing surface;
a peg region in contact with at least a region of the base side of the enlarged region and extending from the enlarged region towards the media-facing surface; and
a heat sink region having a contact side and a base side, and a circumference that extends from proximal to the media-facing to distal from the medial-facing surface, wherein the contact side of the heat sink region is in physical contact with both the peg region and at least a region of the base side of the enlarged region, and the heat sink is formed from plasmonic material and configured to enhance coupling efficiency of the near-field transducer.

20. A system according to claim 19, wherein the heat sink region comprises a disk having a diameter of from about 150 nm to about 350 nm.

* * * * *